US012334286B2

(12) United States Patent
Rhein

(10) Patent No.: US 12,334,286 B2
(45) **Date of Patent: *Jun. 17, 2025**

(54) SINGLE BOTTLE INTERRUPTER

(71) Applicant: Hubbell Incorporated, Shelton, CT (US)

(72) Inventor: David A. Rhein, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 152 days.

This patent is subject to a terminal disclaimer.

(21) Appl. No.: 18/116,079

(22) Filed: Mar. 1, 2023

(65) Prior Publication Data

US 2023/0207240 A1 Jun. 29, 2023

Related U.S. Application Data

(63) Continuation of application No. 17/346,799, filed on Jun. 14, 2021, now Pat. No. 11,600,459, which is a continuation of application No. 16/822,535, filed on Mar. 18, 2020, now Pat. No. 11,037,746, which is a continuation of application No. 14/575,088, filed on Dec. 18, 2014, now Pat. No. 10,600,592.

(60) Provisional application No. 61/917,629, filed on Dec. 18, 2013.

(51) Int. Cl.
*H01H 33/666* (2006.01)
*H01H 33/662* (2006.01)

(52) U.S. Cl.
CPC .... *H01H 33/666* (2013.01); *H01H 33/66207* (2013.01); *H01H 2033/6623* (2013.01)

(58) Field of Classification Search
CPC ............... H01H 33/666; H01H 33/662; H01H 33/66207; H01H 2033/6623
USPC ................................ 218/135, 134, 138, 139
See application file for complete search history.

(56) References Cited

U.S. PATENT DOCUMENTS

| | | | | |
|---|---|---|---|---|
| 2,884,844 | A * | 5/1959 | Sellers | F24D 3/1008 200/462 |
| 2,979,587 | A | 4/1961 | Jennings | |
| 3,129,308 | A | 4/1964 | Yokoyama | |
| 3,141,058 | A | 7/1964 | Titus | |
| 3,705,144 | A | 7/1964 | Genequand | |
| 3,283,100 | A | 11/1966 | Frink | |
| 3,522,404 | A | 8/1970 | Trayer | |
| 3,727,018 | A | 4/1973 | Wesoloski | |
| 3,813,506 | A | 5/1974 | Mitchell | |
| 3,814,885 | A | 6/1974 | Sofianek | |
| 3,866,005 | A | 2/1975 | Amsler | |
| 3,911,239 | A | 10/1975 | Lafferty | |
| 4,032,870 | A | 6/1977 | Oppel | |

(Continued)

OTHER PUBLICATIONS

Alson Grid, Replacing SF6 in high voltage circuit breakers, Spring/Summer 2013 (2 pages).

*Primary Examiner* — William A Bolton
(74) *Attorney, Agent, or Firm* — Michael Best & Friedrich LLP

(57) ABSTRACT

A bellows assembly for a vacuum interrupter. The bellows assembly including an outer cylindrical shell surrounding an opening spring, a spring plate, a contact spring. The bellows assembly further including a bellows. Wherein the bellows assembly reciprocates a moveable contact of the vacuum interrupter to prevent arcing between a pair of contacts and biasing the pair of contacts apart from each other.

6 Claims, 6 Drawing Sheets

(56) References Cited

U.S. PATENT DOCUMENTS

| | | | | |
|---|---|---|---|---|
| 4,063,991 | A | 12/1977 | Farrall | |
| 4,171,474 | A | 10/1979 | Holmes | |
| 4,192,981 | A | 3/1980 | Barkan | |
| 4,250,363 | A * | 2/1981 | Heberlein | H01H 33/664<br>218/123 |
| 4,310,736 | A * | 1/1982 | Takeuchi | H01H 33/66261<br>218/136 |
| 4,492,835 | A | 1/1985 | Turner | |
| 4,568,804 | A | 2/1986 | Luehring | |
| 4,672,156 | A | 6/1987 | Basnett | |
| 4,935,712 | A | 6/1990 | Oyama | |
| 5,191,180 | A | 3/1993 | Kitamura | |
| 5,387,772 | A | 2/1995 | Bestel | |
| 5,388,451 | A | 2/1995 | Stendin | |
| 5,589,675 | A | 12/1996 | Walters | |
| 5,597,992 | A | 1/1997 | Walker | |
| 5,952,635 | A | 9/1999 | Platt | |
| 6,130,394 | A | 10/2000 | Hogl | |
| 6,310,310 | B1 | 10/2001 | Wristen | |
| 6,410,875 | B2 | 6/2002 | Allard | |
| 6,888,086 | B2 | 5/2005 | Baharsh | |
| 7,053,327 | B2 | 5/2006 | Benke | |
| 7,215,228 | B2 | 5/2007 | Rhein | |
| 7,401,760 | B2 * | 7/2008 | Kanzaka | F16K 1/48<br>251/63 |
| 8,119,946 | B2 * | 2/2012 | Stenzel | H01H 31/003<br>218/135 |
| 2011/0155697 | A1 | 6/2011 | Lee | |

* cited by examiner

SINGLE BOTTLE INTERRUPTER

RELATED APPLICATIONS

The present application claims priority to U.S. patent application Ser. No. 17/346,799, filed Jun. 14, 2021, which claims priority to U.S. patent application Ser. No. 16/822,535, filed Mar. 18, 2020, which claims priority to U.S. patent application Ser. No. 14/575,088, filed Dec. 18, 2014, which claims priority to U.S. Provisional Application 61/917,629, filed Dec. 18, 2013, the entire contents of which are incorporated herein by reference.

FIELD

The application relates to an improved current interrupter, and particularly, a single bottle interrupter for integration with a high voltage air switch.

Conventional current interrupters include a plurality of connected vacuum bottles, held within a housing filled with a pressurized gas. The need for multiple vacuum bottles in series is due to the large voltage that is imposed on the vacuum interrupter assembly. Each vacuum bottle houses a pair of contacts that are separated or contacted in order to open or close the circuit. These contacts in the vacuum bottles are opened and closed via a bi-stable mechanism, which is connected to the vacuum bottle housing by a bellows type seal located at one end of the current interrupter. However, the need for multiple vacuum bottles in series increases both the size and cost of the entire assembly.

Furthermore, conventional current interrupters also rely upon pressurized sealed tubes that house the contacts. It can be difficult to manufacture this type of housing and there is also the possibility of failure of the seal to maintain pressure within the housing.

Accordingly, a need exists for an improved vacuum interrupter with a reduced number of vacuum bottles and an improved housing design.

SUMMARY

The application improves upon prior art vacuum interrupters by utilizing a single set of contacts housed in a single vacuum bottle, where typically at least three sets of contacts/vacuum bottles are required. In order to furnish a design including a single vacuum bottle, the bi-stable mechanism and bellows assembly need to be modified to yield a suitable displacement of the moveable contact. This is because it is necessary to achieve adequate separation between the moveable contact and the fixed contact in order to prevent ignition of the arc once extinguished.

Another objective of the application is to provide an improved vacuum bottle housing. Typical vacuum bottles for current interrupters in the prior art are surrounded by glass or pressurized fiberglass housings. The application, according to one embodiment, provides a housing comprised of a solid insulating material. In one example, the housing is comprised of a polymer epoxy, such as a cycloaliphatic polymer epoxy; however, other suitable solid insulating materials may be used.

Another advantage of the application is that the vacuum interrupter is housed in a solid insulating material. However, it is possible that the vacuum interrupter assembly can include a plurality of vacuum bottles contained in various housings. For example, the application can include one to eight vacuum bottles. When more than one vacuum bottle is present, the vacuum bottles are serially connected. Moreover, the vacuum bottles may be housed in pressurized fiberglass (or other glass tubes), or a solid insulating material such as an epoxy or resin, and in particular, a cycloaliphatic epoxy. The vacuum bottle contacts are opened or closed by a pedestal plate attached to one end of each vacuum bottle. However, other suitable mechanisms for operating the contacts can be substituted.

In one embodiment, the application provides a vacuum interrupter for interrupting a voltage. The vacuum interrupter including a vacuum bottle, a bi-stable mechanism, and a bellows assembly. The vacuum bottle having axially seperable contacts, wherein at least one of the contacts is a moveable contact. The bi-stable mechanism including an actuator, and a cam pivotable by the actuator, the cam moving the moveable contact. The bellows assembly reciprocating the moveable contact to prevent arcing between the contacts. The bellows assembly including a spring biasing the contacts apart from each other.

In another embodiment, the application provides a vacuum interrupter for interrupting a voltage. The vacuum interrupter including a housing, a vacuum bottle within the housing, a bi-stable mechanism within the housing, and a bellows assembly within the housing. The vacuum bottle having a contact and a moveable contact. The bi-stable mechanism having a first position and a second position. The bellows assembly movably connected to the bi-stable mechanism and the moveable contact. The bellows assembly including a spring biasing the moveable contact away from the contact when the bi-stable mechanism is in the second position.

In another embodiment, the application provides a vacuum interrupter for interrupting a voltage. The vacuum interrupter including a housing comprised of a polymer epoxy, a vacuum bottle within the housing, a bi-stable mechanism within the housing, and a bellows assembly within the housing. The vacuum bottle having a contact and a moveable contact. The bi-stable mechanism including a pivotably moveable cam moving the moveable contact between a first position and a second position, wherein the moveable contact touches the contact when in the first position and the moveable contact is separated from the contact when in the second position. The bellows assembly including a spring biasing the moveable contact away from the contact.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
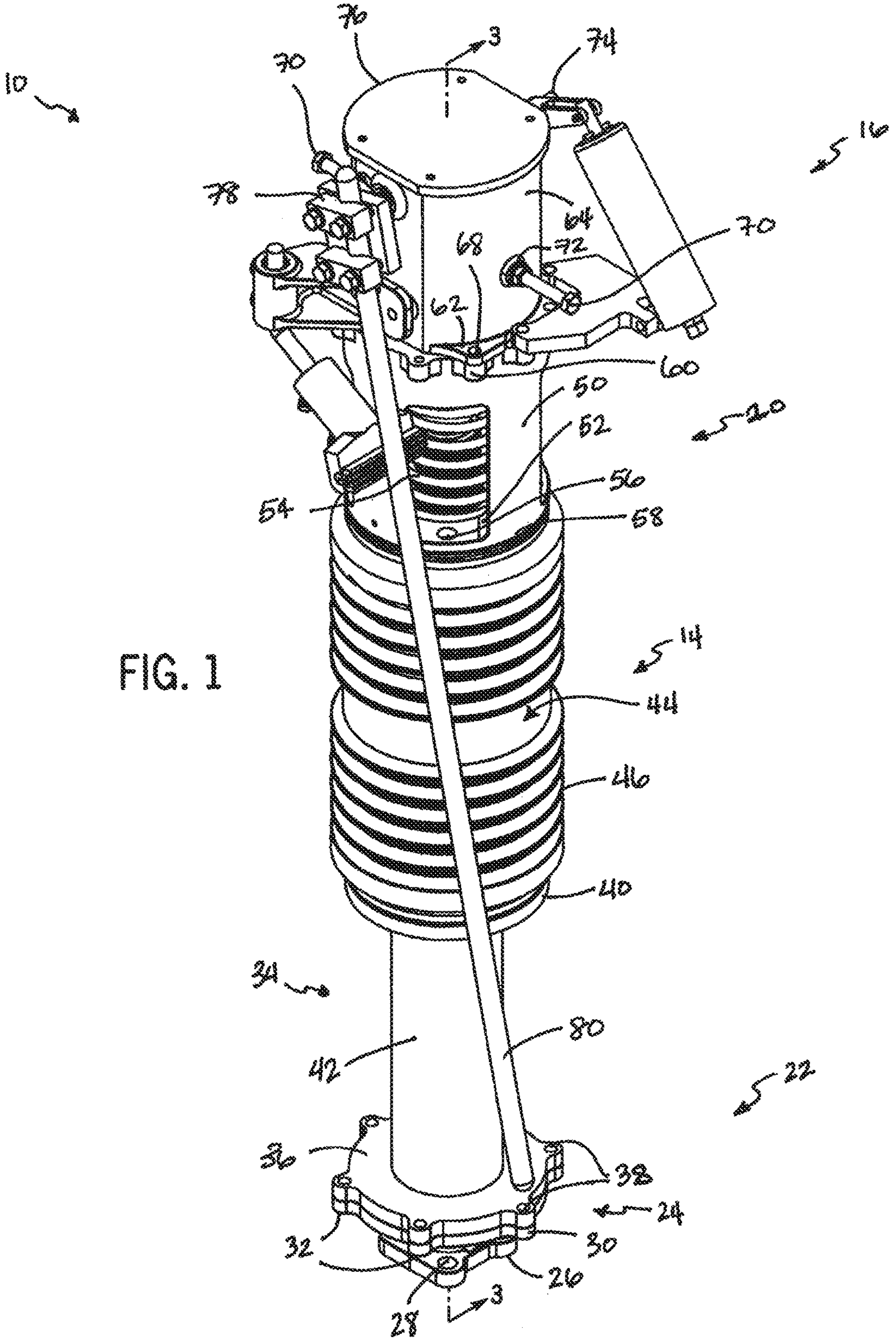
FIG. 1 is a perspective view of a single bottle vacuum interrupter assembly according to one embodiment.

FIG. 1 illustrates a perspective view of a single bottle vacuum interrupter assembly 10, according to one embodiment. The vacuum interrupter assembly 10 has a generally elongated, cylindrical construction including a centrally positioned vacuum bottle housing 14, an upper end 16 having a bi-stable mechanism 18 (see FIGS. 2 and 6) and a bellows assembly 20, and a lower end 22. The lower end 22 includes a foot 24 having a lower foot end 26 with holes 28 or other similar features. Holes 28 enable the vacuum interrupter assembly 10 to be fastened or otherwise connected to another structure such as a component of a power transmission structure. An upper foot end 30 of the foot 24 has a disc-shaped construction. A number of holes 32 are positioned at regular intervals about a circumference of the disc-shaped upper foot end 30.

The lower end 22 further includes a pedestal 34 having a lower pedestal end 36. The lower pedestal end 36 has a disc-shaped construction similar to that of the upper foot end 30. The lower pedestal end 36 also has a number of holes 38 positioned at regular intervals about a circumference of the disc-shaped lower pedestal end 36. The holes 38 are positioned to align with holes 32 such that the foot 24 can be fastened to the pedestal 34 with screws, bolts, rivets or other suitable fasteners. Alternatively, the foot 24 can be attached to the pedestal 34 by other means including welding, adhesives, or by casting the foot 24 and pedestal 34 as a monolithic structure. A disc-shaped upper pedestal end 40 of the pedestal 34 is connected to the lower pedestal end 36 by an elongated cylindrical shaft 42. The elongated cylindrical shaft 42 is positioned generally along a central axis of the vacuum interrupter assembly 10.

Continuing along the central axis of the vacuum interrupter assembly 10, the singular vacuum bottle housing 14 is disposed on the upper pedestal end 40 of the pedestal 34. The vacuum bottle housing 14 includes an outer shell 44 having a circumferentially ribbed surface 46. Disposed on top of the vacuum bottle housing 14 is the bellows assembly 20. The bellows assembly 20 includes an outer cylindrical shell 50. A number of windows 52 are spaced around the cylindrical shell 50 such that an opening spring 54 of the bellows assembly 20 is visible through the windows 52. A set of passages 56 are located about an outer circumference of a lower shell end 58 of the cylindrical shell 50 for fastening the bellows assembly 20, and thereby the bi-stable mechanism 18, to the vacuum bottle housing 14.

Figure 2:
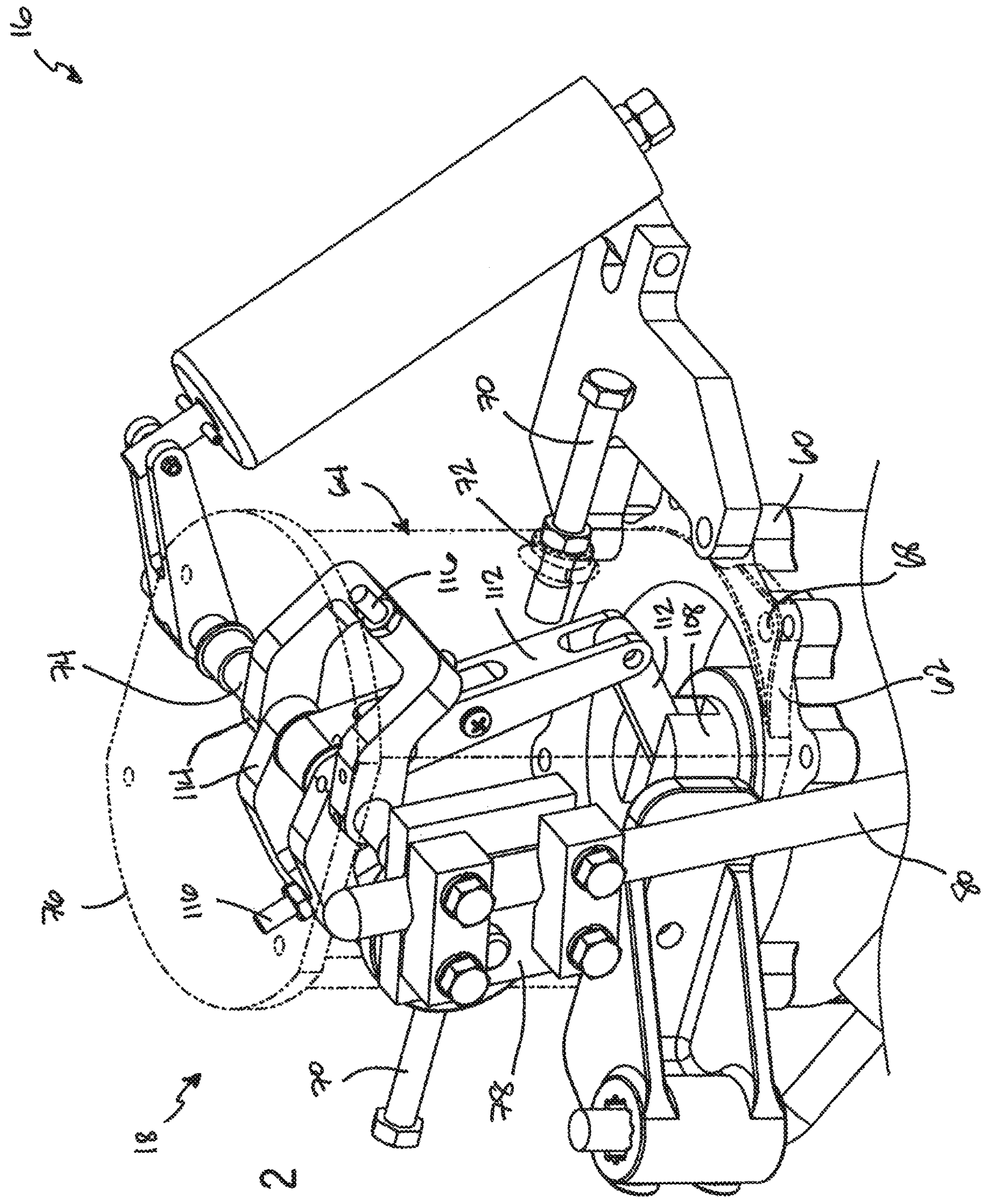
FIG. 2 is a partial perspective view of a bi-stable mechanism of the single bottle vacuum interrupter assembly of FIG. 1.

As further illustrated in FIG. 2, an externally flanged upper end 60 of the cylindrical shell 50 interfaces with a lower housing end 62 of a generally cylindrical housing 64 of the bi-stable mechanism 18. A set of fasteners, such as bolts, screws, or other suitable fasteners, pass through a second set of passages 68 in the lower housing end 62 and through the flanged upper end 60 to connect the bi-stable mechanism 18 to the bellows assembly 20. A pair of opposed bi-stable link adjustment bolts 70 pass through openings 72 in the cylindrical housing 64. The bi-stable link adjustment bolts 70 are oriented in a transverse direction (i.e., orthogonal) relative to the central axis of the vacuum interrupter assembly 10. A shaft 74 extends through the cylindrical housing 64 at a right angle relative to the opposed bi-stable link adjustment bolts 70. The shaft 74 is spaced laterally apart from bi-stable link adjustment bolts 70 towards an upper housing end 76 of the cylindrical housing 64. An end of the shaft 74 passes through a connector 78 located external to the cylindrical housing 64. The connector 78 is configured to receive and fasten to one end of a conductive operating arm 80 (e.g., an actuator) such that the operating arm 80 is rotatable about an axis of the shaft 74. In the embodiment illustrated in FIG. 1, the connector 78 includes a pair of clamps for retaining the operating arm 80.

Figure 3:
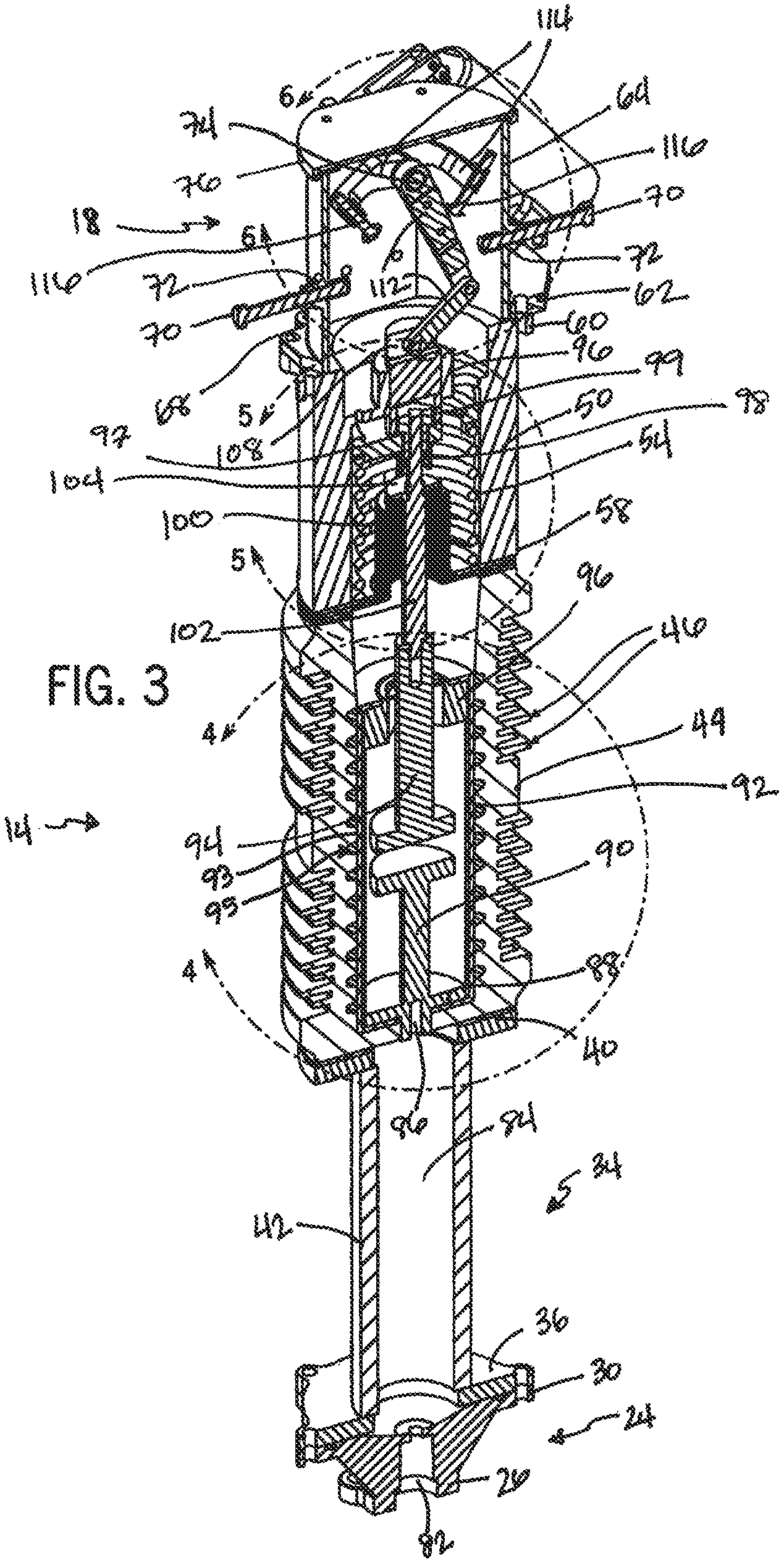
FIG. 3 is a cross-sectional perspective view taken along line 3-3 of FIG. 1 of the single bottle vacuum interrupter assembly of FIG. 1.

FIG. 3 illustrates a cross-sectional perspective view of the vacuum interrupter 10. The foot 24 includes a cavity 82 which is in communication with a hollow portion 84 of the pedestal 34. The hollow portion 84 terminates at the disc-shaped upper pedestal end 40 of the pedestal 34. A fastener 86, such as a screw, bolt, or other suitable fastener, passes through the upper pedestal end 40 and into a lower contact end 88, of a fixed contact 90 within the vacuum bottle 92.

Figure 4:
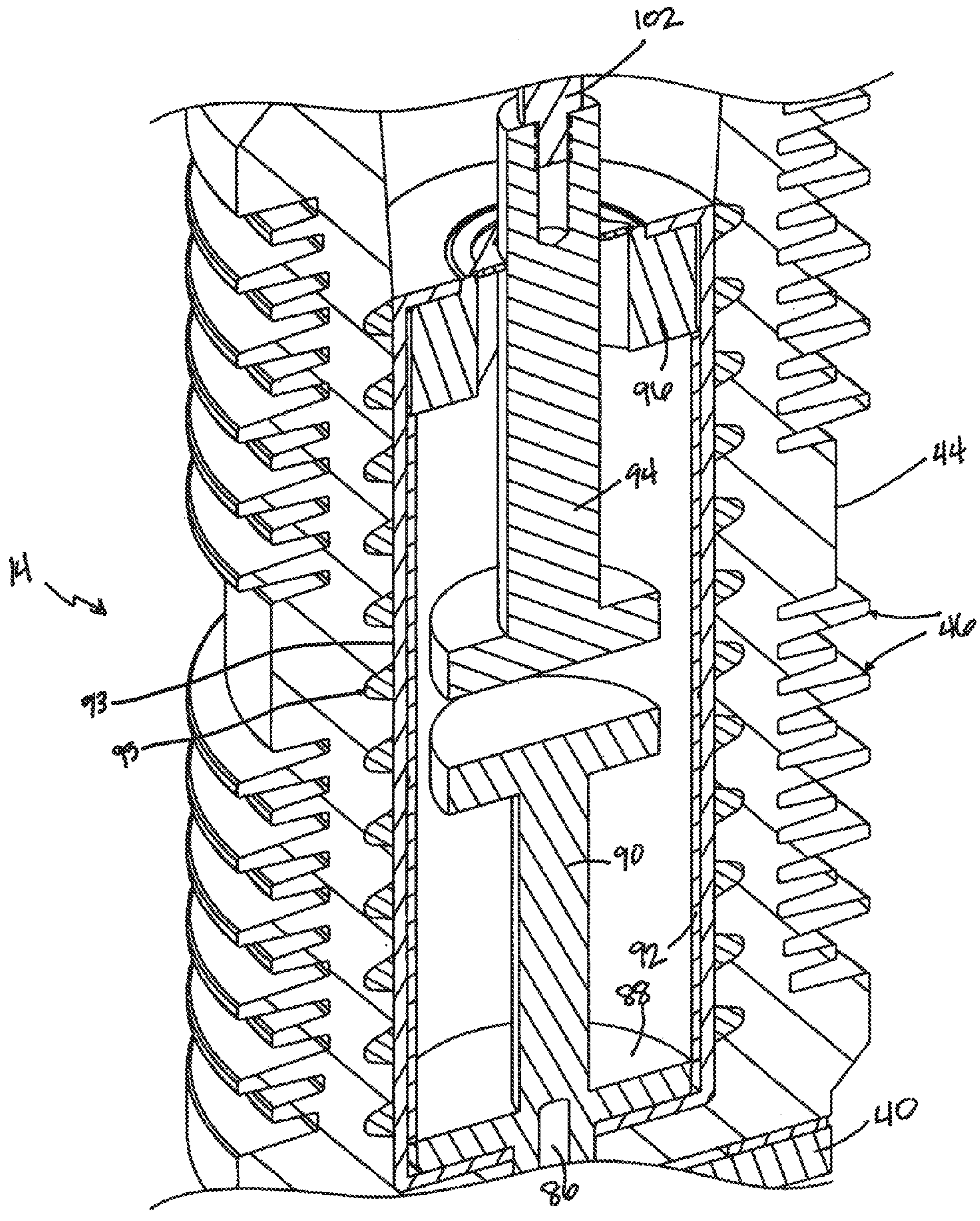
FIG. 4 is a partial cross-sectional perspective view taken along arc 4-4 of FIG. 3 of the single bottle vacuum interrupter assembly of FIG. 1.

FIG. 4 illustrates a partial cross-sectional perspective view taken along arc 4-4 of FIG. 3. As illustrated in FIG. 4, the vacuum bottle 92 includes a hollow cylindrical structure capable of maintaining a vacuum seal. The vacuum bottle 92 is encased in a jacket 93 having a ribbed outer surface 95. In one embodiment, the jacket 93, including the ribbed surface 95, is comprised of silicone rubber. In another embodiment, the jacket 93, including the ribbed surface 95, is comprised of a flexible plastic. In yet another embodiment, the jacket 93, including the ribbed surface 95, is comprised of another suitable, flexible, material, or combination of suitable, flexible, materials. The ribbed surface 95 of the jacket 93 interfaces with the outer shell 44 of the vacuum bottle housing 14. In addition to the fixed contact 90, the vacuum bottle 92 contains a moveable contact 94 such that the central axis of the fixed and moveable contacts 90 and 94, respectively, are coaxial with a central axis of the vacuum interrupter assembly 10. Furthermore, the moveable contact 94 is slidably displaceable through a bushing 96 along the central axis of the vacuum interrupter assembly 10. As illustrated, the vacuum bottle 92 is encased within the solid vacuum bottle housing 14. In one embodiment, the vacuum bottle housing 14 is an epoxy, such as a cycloaliphatic epoxy. Alternatively, a pressurized fiberglass tube can be substituted for the solid vacuum bottle housing 14.

Figure 5:
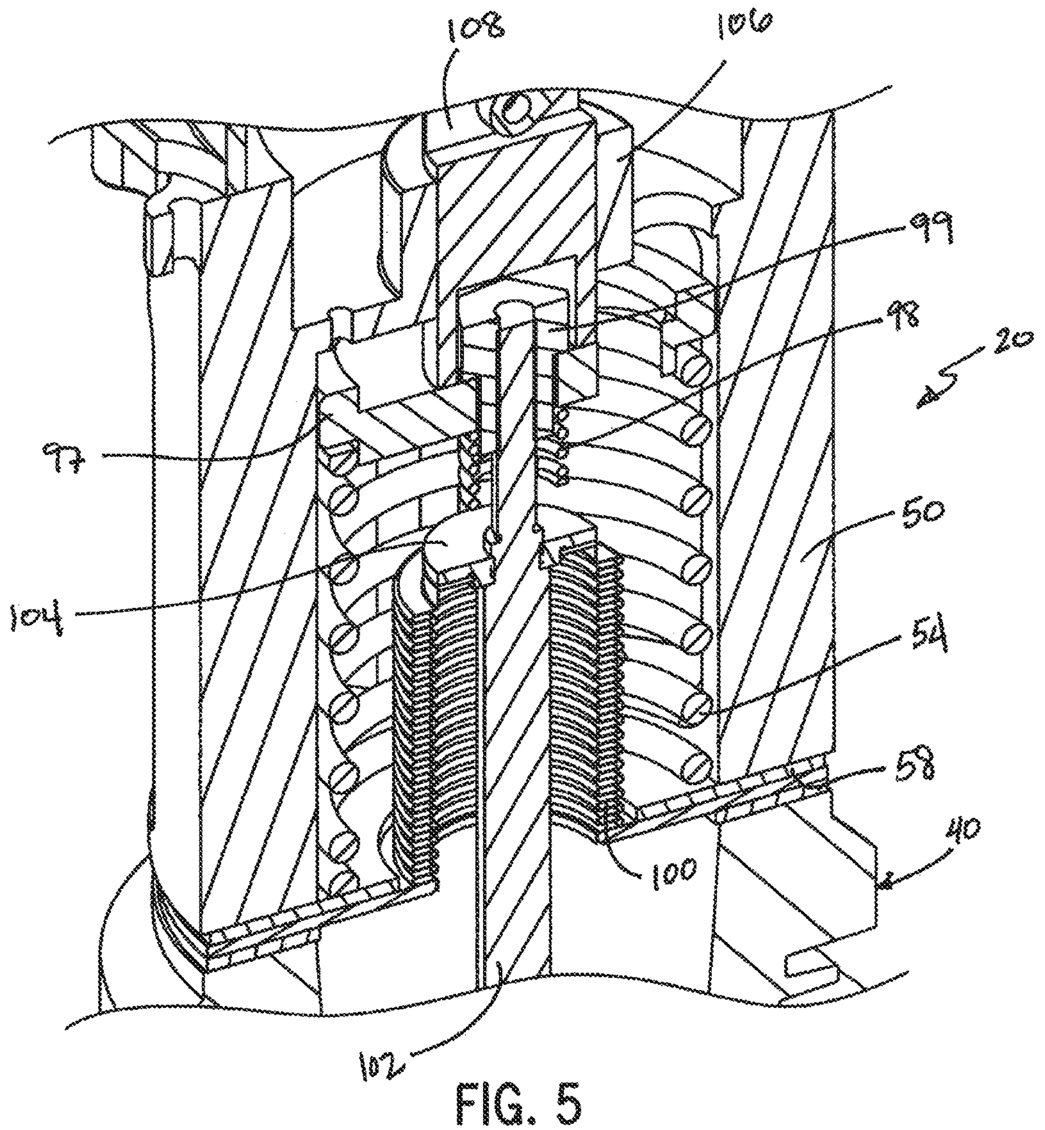
FIG. 5 is a partial cross-section perspective view taken along arc 5-5 of FIG. 3 of a bellows assembly of the single bottle vacuum interrupter assembly of FIG. 1.

FIG. 5 illustrates a partial cross-section perspective view taken along arc 5-5 of FIG. 3. As illustrated in FIG. 5, the bellows assembly 20 is positioned above the vacuum bottle housing 14. The outer cylindrical shell 50 surrounds a series of coaxially positioned elements including the opening spring 54, spring plate 97, contact spring 98, and bellows 100. The spring plate 97 is in contact with a spring plate nut 99, which is threaded into the bellows 100. The contact spring 98 and bellows 100 are smaller in diameter than the opening spring 54. A shaft 102 extends from the upper shell end 60 of the cylindrical shell 50, through the spring plate 97, contact spring 98, bellows 100, and lower shell end 58, and forms an internal connection with the moveable contact 94. Alternatively, the shaft 102 can be fixed to the moveable contact 94 by other suitable means.

The shaft 102 includes a radial projection 104 located at an intermediate position along the length of the shaft 102. The contact spring 98 is positioned between the spring plate 97 and the radial projection 104, while the bellows 100 is positioned between the radial projection 104 and the lower shell end 58. The bellows 100 forms a gas and liquid barrier with the radial projection 104 at one end and with the lower shell end 58 at the other end, thereby isolating the moveable contact 94 within the vacuum bottle 92. In one embodiment, projection 104 is attached (e.g., welded) to the bellow 100, thereby allowing shaft 102 to be threaded and sealed from water ingress with a sealing compound.

Figure 6:
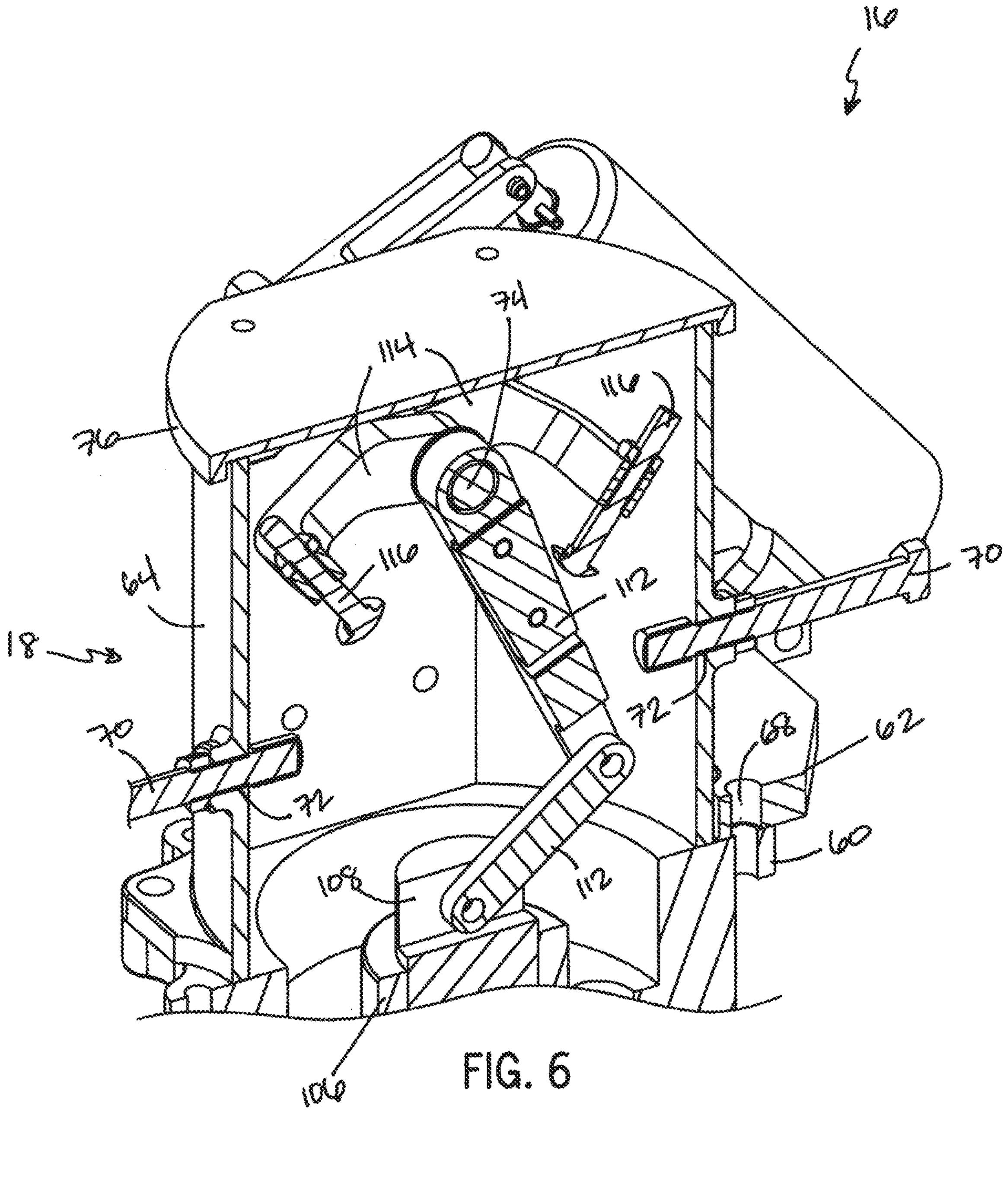
FIG. 6 is a partial cross-section perspective view taken along arc 6-6 of FIG. 3 of the bi-table mechanism of the single bottle vacuum interrupter assembly of FIG. 1.

FIG. 6 illustrates a partial cross-section perspective view taken along arc 6-6 of FIG. 3. As illustrated in FIGS. 2 and 6, a passageway 106 extends through the upper shell end 60 of the outer cylindrical shell 50 and opens into an interior space defined by the cylindrical housing 64 of the bi-stable mechanism 18. A clevis 108 is positioned within the passageway 106. The clevis 108 couples the upper end of the shaft 102 to the bi-stable mechanism 18. The bistable mechanism 18 generally inhabits a vertical plane parallel to an axis of the vacuum interrupter assembly 10 and includes a pair of pivotably connected links 112 and a carriage 114. The links 112 are independently pivotable about an axis of the shaft 74, while the carriage 114 is pivotable with the shaft 74. A pair of bumpers, or actuators, 116 is coupled to the carriage 114 such that rotation of the carriage 114 causes the bumpers 116 to impinge upon the links 112 in order to displace the links 112. The extent to which the links 112 can move is limited by adjustment of the opposed bi-stable link adjustment bolts 70, which are also generally oriented in the plane of the bi-stable mechanism 18. Displacement of the links 112 results in a displacement of the clevis 108 along the axis of the of the vacuum interrupter assembly 10, and therefore a displacement of the shaft 102 and moveable contact 94.

In operation, the vacuum interrupter assembly 10 starts in a closed position. In the closed position, the bi-stable mechanism 18 is in a first position such that the moveable contact 94 and fixed contact 90 are made to touch, or contact, each other. In this position, the opening spring 54 is compressed by the spring plate 97. The spring plate 97 is held in position by the links 112 pushing the clevis 108 against the upper face of the spring plate 97. Contact pressure is applied to the bellows 100 and shaft 102 by the contact spring 98 in order to maintain contact.

In the closed position, a current can travels through the vacuum interrupter assembly 10, in the following manner. Current travels through the foot 24, pedestal 34, and into the fixed contact 90. The current then flows from the fixed contact 90 to the moveable contact 94 and into the shaft 102. From shaft 102, the current flows to cylindrical shell 50 through a first flexible conductive braid to upper shell end 60, into shaft 74 via a second flexible conductive braid, and into the conductive operating arm 80.

The vacuum interrupter assembly 10 provides arc quenching when transitioned into the open position. Opening occurs when the operating arm 80 is pivoted on the axis of the shaft 74, thereby rotating the carriage 114 and bumpers 116. As the bi-stable links 112 are forced over center by the bumpers 116, the clevis 108 releases the spring plate 97 allowing the opening spring 54 to push upward. The spring plate 97 pushes the spring plate nut 99, which is threaded to the bellows 100, upward. This action pulls the moveable contact 94 upward to the open position. Throughout this movement the passage 106 provides a bushing surface for the clevis 108 and the cylindrical shell 50 provides a bushing surface for the spring plate 97. When in the open position, arcing is prevented between the contacts at approximately 69 kV. In another embodiment, arcing is prevented between the contacts at a voltage greater than approximately 69 kV.

As best shown in FIG. 4, the difference in the two positions of the bi-stable assembly is a three-quarter inch displacement along the central axis of the vacuum interrupter assembly 10. Within the vacuum bottle, the bellows 100 biases the fixed and moveable contacts 90 and 94 towards the closed position. The bi-stable mechanism 18 provides for free and rapid movement of the pedestal plates and the vacuum bottle contacts, as is required for quick separation of the contacts.

The vacuum interrupter assembly 10 improves upon prior art vacuum interrupters by utilizing a single set of contacts housed in a single vacuum bottle, where typically at least three sets of contacts/vacuum bottles are required. In order to furnish a design including a single vacuum bottle, the bi-stable mechanism and bellows assembly need to be modified to yield a suitable displacement of the moveable contact. This is because it is necessary to achieve adequate separation between the moveable contact and the fixed contact in order to prevent ignition of the arc once extinguished.

Another objective of the vacuum interrupter assembly 10 is to provide an improved vacuum bottle housing. Typical vacuum bottles for current interrupters in the prior art are surrounded by glass or pressurized fiberglass housings. The vacuum interrupter assembly 10, according to one embodiment, provides a housing comprised of a solid insulating material. In one example, the housing is comprised of a polymer epoxy, such as a cycloaliphatic polymer epoxy, however, other suitable solid insulating materials may be used.

Another advantage of the vacuum interrupter 10 is that the vacuum interrupter 10 is housed in a solid insulating material. However, it is possible that the vacuum interrupter assembly 10 can include a plurality of vacuum bottles contained in various housings. For example, the vacuum interrupter assembly 10 can include one to eight vacuum bottles. When more than one vacuum bottle is present, the vacuum bottles are serially connected. Moreover, the vacuum bottles may be housed in pressurized fiberglass (or other glass tubes), or a solid insulating material such as an epoxy or resin, and in particular, a cycloaliphatic epoxy. The vacuum bottle contacts are open or closed by a pedestal plate attached to one end of each vacuum bottle. However, other suitable mechanisms for operating the contacts can be substituted.

Thus, the application provides, among other things, a vacuum interrupter for interrupting a voltage. Various features and advantages of the application are set forth in the following claims.

What is claimed is:

1. A bellows assembly for a vacuum interrupter, the bellows assembly comprising:

an outer cylindrical shell surrounding an opening spring, a spring plate, a contact spring; and a bellows;

wherein the bellows assembly reciprocates a moveable contact of the vacuum interrupter to prevent arcing between a pair of contacts and biasing the pair of contacts apart from each other.

2. The bellows assembly of claim 1, wherein the bellows assembly is positioned above the vacuum interrupter.

3. The bellows assembly of claim 1, wherein the bellows assembly is coupled to a housing.

4. The bellows assembly of claim 3, wherein the housing is comprised of a polymer epoxy.

5. The bellows assembly of claim 1, wherein current flows through the pair of contacts in a closed position.

6. The bellows assembly of claim 1, wherein a flow of current through the pair of contacts is stopped when the pair of contacts are apart from each other.

* * * * *